United States Patent [19]

Appling et al.

[11] Patent Number: 4,709,358

[45] Date of Patent: Nov. 24, 1987

[54] BRIDLE CONFIGURATION FOR TOWED UNDERWATER VEHICLE

[75] Inventors: James Appling, Canoga Park; Calvin A. Gongwer, Glendora, both of Calif.

[73] Assignee: Allied Corporation, Morristown, N.J.

[21] Appl. No.: 745,559

[22] Filed: Jun. 17, 1985

[51] Int. Cl.⁴ ........................... G01S 3/80; B63B 21/56

[52] U.S. Cl. ..................................... 367/106; 367/130; 114/244; 114/330

[58] Field of Search ................................ 114/242-245, 114/330; 367/106, 130, 105, 16, 17

[56] References Cited

U.S. PATENT DOCUMENTS

| | | | |
|---|---|---|---|
| 3,120,208 | 2/1964 | Lawrie | 114/244 |
| 4,173,195 | 11/1979 | Gongwer | 367/106 |
| 4,203,162 | 5/1980 | Clearwaters et al. | 367/105 |
| 4,378,750 | 4/1983 | Holzhauer | 114/242 |

*Primary Examiner*—Thomas H. Tarcza

*Assistant Examiner*—Daniel T. Pihulic

[57] ABSTRACT

A towed underwater transducer assembly includes a spherical housing (10) suspended from a towing vehicle at the end of a cable (12). The housing includes mounting brackets (26, 28) located less than one-half of the circumference of the housing apart along a meridian of the housing (10) centered in the direction of tow with a bridle cable (24) extending between the mounting brackets including a turnbuckle (32) to adjust its tension and a mechanical stop (30). A grooved pulley wheel (22) is mounted at the end of the towing cable (12) with the bridle cable (24) riding in the groove and the pulley wheel (22) free to seek a position along the bridle cable (24) such that the projected line of the tow cable (12) passes essentially through the geometric center of the spherical housing (10) thereby causing the spherical housing (10) to maintain an essentially vertical orientation irrespective of variations in the speed of tow.

4 Claims, 3 Drawing Figures

BRIDLE CONFIGURATION FOR TOWED UNDERWATER VEHICLE

STATEMENT OF GOVERNMENT INTEREST

The invention described herein may be manufactured and used by or for the Government of the United States of America for governmental purposes without the payment of any royalties thereon or therefor.

This invention relates to a towed underwater sonar transducer assembly having a spherical housing and a tow bridle assembly for attaching said housing to its tow cable.

Where it is desired to suspend a spherical transducer assembly from a vehicle at the end of a cable and to tow said transducer assembly, it is necessary for the assembly to maintain a reasonably consistent orientation despite having some horizontal velocity through the water. A spherical body will tend to be somewhat unstable under such conditions in that it may tend to roll around the projected axis of the tow cable, it may tend to oscillate in yaw and it will tend to be pulled by the cable such that it tilts in the direction of tow. Since the housing carries sonar transducer elements and since the orientation of the transducer elements must be known within limits, it becomes important that means be provided to minimize unstability of the housing under tow.

Applicant has found that by designing the spherical transducer so that, in operation in the water, the center of gravity of the housing is slightly forward of and significantly below its geometric center and by attaching the tow cable to the housing through a suitable bridle structure, the desired vertical orientation of the transducer can be largely maintained while minimizing the instability factors referred to above. Vertical orientation in this case is the orientation which the sphere would assume at the end of the cable if no horizontal towing forces were applied. Applicant's bridle structure consists of a cable attached to mounting points on the surface of the housing which are aligned along a meridian of the sphere the plane of which extends in the direction of tow with a pulley attached to the cable and free to move along the bridle cable. A mechanical stop has been found desirable to prevent backward tilting of the housing should the pulley attempt to move aft of the vertical centerline of the spherical housing.

Figure 1:
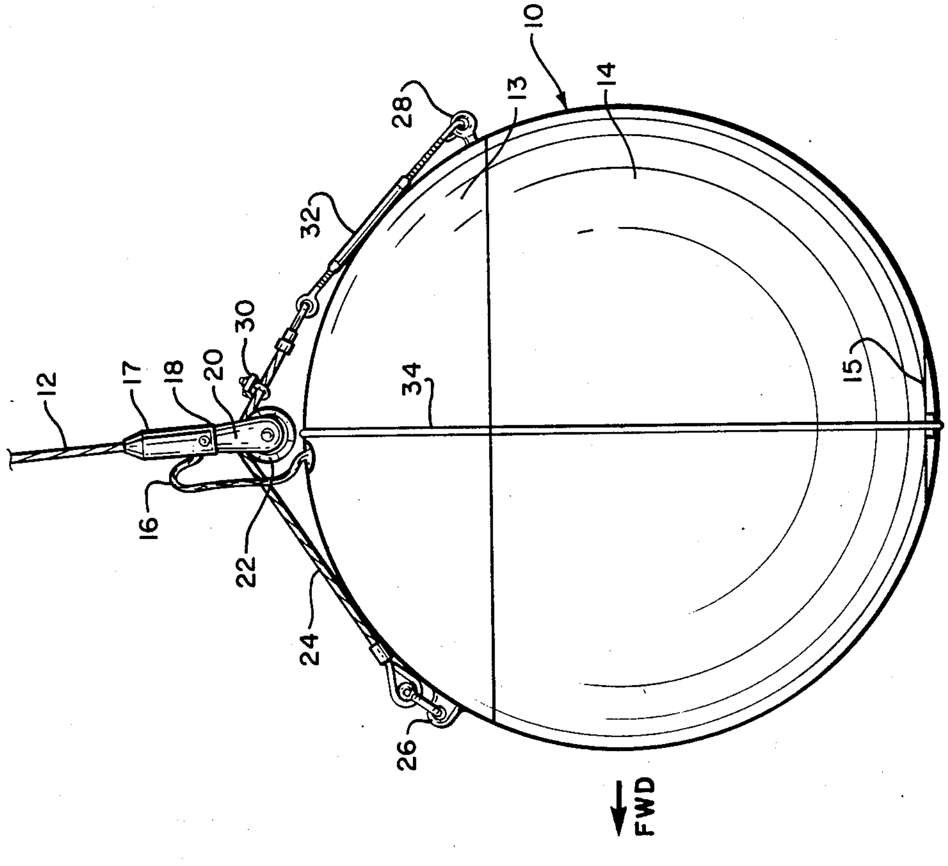
FIG. 1 is a view from the side of a spherical sonar transducer attached to a tow cable with a bridle structure according to my invention.

Referring now to FIG. 1, a spherical sonar transducer housing 10 is shown suspended at the end of a tow cable 12 which is suspended from a vehicle, not shown. The vehicle could be a ship or a helicopter and towing speeds would normally be of the order of 3–7 knots. The particular spherical sonar transducer includes a metal dome 13 and a lower portion 14 which is of plastic, and which contains a large opening 15 at the bottom to permit ingress and egress of water. The housing is thus free flooding and includes both receiving hydrophones and sonar projectors and the required electronic assemblies in water-proof housings. Since the transducer housing is free flooding it obviously has substantially negative buoyancy. Tow cable 12 includes one or more electrical conducting wires 16 which are connected to the sonar electronic circuitry within the housing and a strength member which carries the weight of the transducer housing 10 and the forces from towing and lifting the housing 10. The strength member is securely anchored to a termination and strain relief portion 17 of a pulley assembly 18. Attached to the termination portion 17 is a pulley support bracket 20 carrying an axle upon which a pulley wheel 22 rotates. A bridle cable 24 is attached to mounting points 26 and 28 which may be eyebolts and which are located along a circumferential line or meridian of the sphere oriented in the direction of tow. Pulley wheel 22 includes a groove in which cable 24 rides. A mechanical stop 30 carried on cable 24 prevents pulley wheel 22 from moving aft and tilting the housing backwards. A turnbuckle 32 provides a means for adjusting the effective length or slack in the cable. A trip wire 34 is fastened around the housing 10, on a circumferential line substantially normal to the direction of tow. This wire, which could also be a molded projection, aids in avoiding oscillation of the spherical housing and is described in greater detail in a patent to Calvin Gongwer, U.S. Pat. No. 4,173,195 (common assignee).

Figure 2:
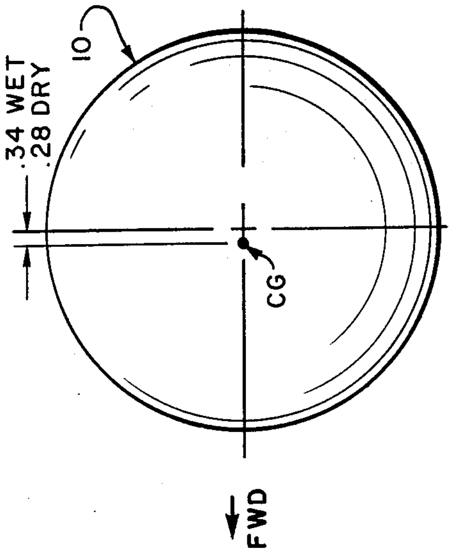
FIG. 2 is a diagrammatic plan view of a spherical housing according to my invention indicating the forward displacement of the center of gravity from the geometric center of the sphere.
Figure 3:
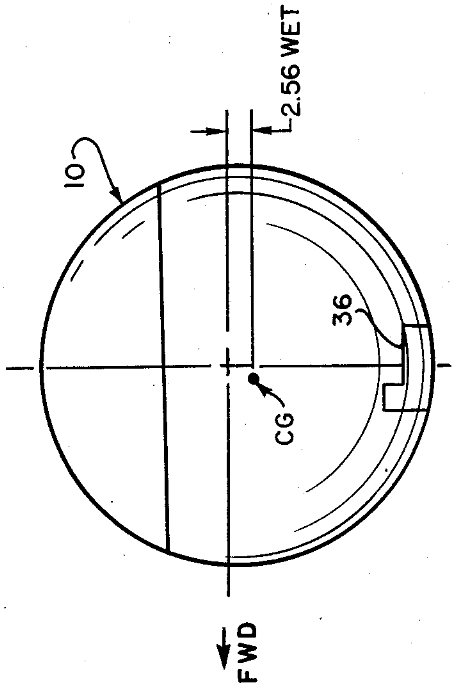
FIG. 3 is a diagrammatic side view of the housing of FIG. 2 showing the displacement of the center of gravity below the geometric center of the sphere.

FIG. 2 is a diagrammatic plan view of spherical housing 10 with the center of gravity (C.G.) shown in its location as viewed from the top. FIG. 3 is a diagrammatic side view of spherical housing 10 showing the center of gravity as viewed from the side. It will be clear to those skilled in the art that some variation in the location of the center of gravity of a spherical sonar housing such as housing 10 is to be expected with variations in configuration of the internal components. It is important, however, that the center of gravity of the sphere be located forward of and below the geometrical center of the housing. As shown in FIG. 3, a weight 36 may be included to correct the center of gravity location as desired.

In operation, the sonar transducer is reeled from the towing vehicle and permitted to descend into the water to a desired depth. As stated above, the towing speeds may be between 3 and 7 knots and this towing force will, of course, add a horizontal component of force to the vertical force on the cable 12 caused by the weight of the housing 10 and its components. This causes the cable 12 to have a tilt in the forward direction which, in the case of attachment of the cable to a fixed point on the housing, would cause the housing 10 to be tilted forwardly also. With the structure described above, the horizontal component is largely compensated by means of the bridle and pulley arrangement which permits pulley wheel 22 to roll along cable 24 until the forces are balanced. This permits the housing 10 to remain essentially vertical with the pulley wheel 22 assuming a position along cable 24 where a line projected from the cable through the pulley wheel will pass substantially through the center of the sphere. Increases in towing speed will cause the pulley wheel 22 to move to the left along cable 24 and decreases in towing speed will cause pulley wheel 22 to move to the right, closer to vertical. Should the housing 10 drop into the water in such a way as to cause it to tilt backward, or should the housing tend to tilt backward upon being pulled from the water the pulley wheel will contact the stop 30 preventing backward tilt to any signficant extent. This is quite necessary to ensure prompt draining of the housing when it is pulled from the water.

Modifications will be apparent to those skilled in the art. The configuration of the housing although spherical, or essentially spherical, may vary as to materials and weight distribution, which will affect the location of the center of gravity, but the general location should be as described to ensure that the housing maintains the desired attitude.

We claim:

1. A towed underwater transducer assembly including a spherical housing, acoustic transducer elements on the surface of said housing and a cable attached to said housing and suspended from a towing vehicle, said cable including an electrical conductor and a strength member, said housing when suspended in the water on said cable with some lateral component of velocity having a weight located opposite said cable and a center of gravity slightly forward of and significantly below its geometric center, said housing including a vent of substantial area to permit flooding of the interior of said housing, and a small projection extending around a meridian of said housing approximately normal to the direction of tow, characterized in that said cable is attached to said housing by means of a bridle which includes a pair of mounting means aligned along a meridian of said sphere the plane of which extends in the direction of tow said mounting means being less than one half of the circumference of the sphere apart, a bridle cable is attached to said mounting means which is somewhat longer than the circumferential distance between said mounting means, a pulley assembly including strain relief means and a grooved pulley wheel is attached to the end of said cable and suspended from said strength member, said bridle cable being carried in the groove of said pulley wheel and said electrical conductor is connected from said support to said housing and includes extra length to permit said pulley to move a significant distance along said cable without loading said electrical conductor, such that when said transducer is towed by said vehicle, said pulley wheel will respond to the resulting horizontal component of force by moving along said bridle cable as required to keep the projected line of the tow cable passing substantially through the geometric center of said spherical housing.

2. A towed underwater transducer assembly as set forth in claim 1 wherein said bridle cable includes a mechanical stop to prevent said pulley from moving to a position substantially aft of the vertical centerline of the sphere and thereby tilting the sphere in the aft direction.

3. A towed underwater transducer assembly as set forth in claim 1 wherein said bridle cable includes a turnbuckle to adjust its effective length.

4. A towed underwater transducer assembly as set forth in claim 1 wherein said pulley assembly further includes support brackets, an axle carried in said support brackets carrying said grooved pulley wheel and said pulley assembly is attached to said strength member.

* * * * *